(12) United States Patent
Gleasman et al.

(10) Patent No.: US 6,241,327 B1
(45) Date of Patent: Jun. 5, 2001

(54) ENDLESS TRACK FOR HIGH SPEED MULTI-TERRAIN VEHICLES

(75) Inventors: Vernon E. Gleasman, Pittsford; Keith E. Gleasman, Fairport, both of NY (US)

(73) Assignee: Torvec, Inc., Pittsford, NY (US)

( * ) Notice: Subject to any disclaimer, the term of this patent is extended or adjusted under 35 U.S.C. 154(b) by 0 days.

(21) Appl. No.: 09/435,218

(22) Filed: Nov. 5, 1999

(51) Int. Cl.$^7$ .......................... B60B 15/00; B62D 55/00; B62D 55/24; B62D 55/275; B62D 55/21
(52) U.S. Cl. .......................... 305/157; 305/165; 305/178
(58) Field of Search .................... 305/158, 157, 305/160, 165, 178, 179, 180

(56) References Cited

U.S. PATENT DOCUMENTS

| | | | |
|---|---|---|---|
| 3,107,128 | * 10/1963 | Ruane | 305/178 |
| 3,619,012 | * 11/1971 | Bizier | 305/157 |
| 4,410,219 | * 10/1983 | van der Lely | 305/180 |
| 4,846,091 | * 7/1989 | Ives | 305/178 |
| 5,352,029 | * 10/1994 | Nagorcka | 305/179 |
| 5,894,900 | * 4/1999 | Yamamoto et al. | 305/165 |
| 6,065,818 | * 5/2000 | Fischer | 305/160 |

FOREIGN PATENT DOCUMENTS

355072469 * 5/1980 (JP) .......................... 305/165
355079764 * 6/1980 (JP) .......................... 305/178

* cited by examiner

Primary Examiner—S. Joseph Morano
Assistant Examiner—Jason R. Bellinger
(74) Attorney, Agent, or Firm—Eugene Stephens & Associates; Morton A. Polster

(57) ABSTRACT

In a conventional rubber track of the type supported and driven by wheels mounted on a vehicle, the terrain-contacting lugs are modified specially for use on high speed multi-terrain vehicles to increase energy efficiency of track operation. The thickness of each terrain-contacting lug is only tapered outboard of the central portion of the basic carcass/belt that is in direct contact with the rubber-tired supporting wheels so that, when traversing flat and hard terrain (e.g., when on pavement), these tapered portions are substantially out of contact with the terrain, thereby reducing the frictional drag of the lugs. However, as the terrain softens, the contact between these same tapered portions and the terrain increases to provide additional traction when traversing uneven, wet, or snow-covered surfaces. In preferred embodiments, the track is further modified by at least one relatively thin cut being made throughout substantially the entire thickness dimension of each lug down to the exterior surface of the carcass belt to reduce the force required to stretch the heavy lugs of the track as the track changes direction when being moved over the circumferential surfaces of the rubber-tired drive wheels of the vehicle's track suspension system.

6 Claims, 2 Drawing Sheets

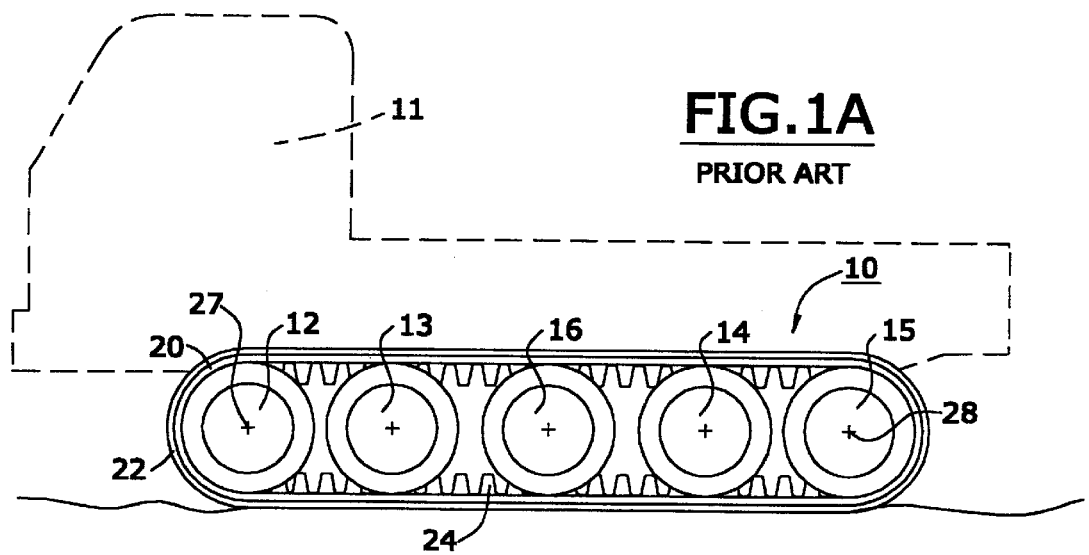
FIG.1A PRIOR ART
FIG.1B PRIOR ART
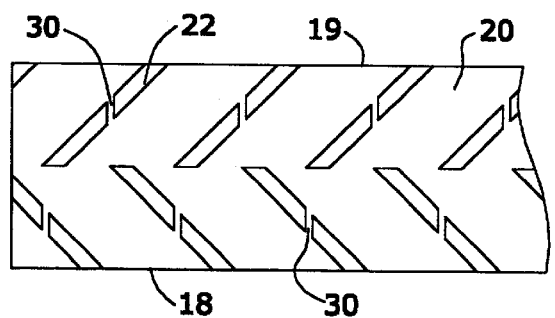
FIG.2A
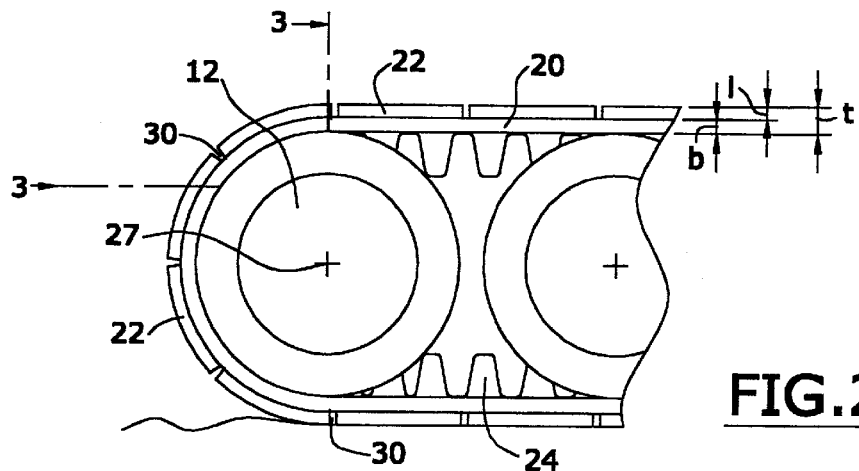
FIG.2B

ENDLESS TRACK FOR HIGH SPEED MULTI-TERRAIN VEHICLES

TECHNICAL FIELD

This invention relates to endless tracks used to propel track-laying vehicles [i.e., vehicles which use endless tracks rather than tires to contact the terrain over which they are driven, e.g., tractors, tanks, bulldozers, etc.] and, more particularly, to an improved track design in a format allowing the endless track to be driven more efficiently at low speeds as well as at highway speeds [e.g., 88 kilometers (55 miles)/hour].

BACKGROUND

Many track-laying vehicles are driven and supported by rubber tracks. [NOTE: As used herein, the term "rubber" relates to any elastic and primarily non-metallic materials such as rubber, elastomers, or combinations thereof used in the manufacture of endless tracks.]

While the invention is applicable to endless tracks for all track-laying vehicles, its particular purpose is to increase the efficiency of such new track-laying all-terrain vehicles of the type specifically designed for normal speed travel over paved highways as well as for appropriate use over unpaved roads and uneven off-road terrain. (E.g., see the track-laying all-terrain vehicle disclosed in U.S. patent application Ser. No. 09/213,650.)

As indicated in the just-identified patent property, there is presently an acute need for a form of vehicle appropriate for both normal highway use and off-road use over snow-covered, very uneven, or muddy terrain. There is significant need for such a vehicle following natural emergencies (snow and wind storms, floods, etc.), and such vehicles are at present particularly needed in developing countries. Unfortunately, almost all available automotive vehicles require infrastructure (paved highways, bridges, etc.) for practical operation, and the developing countries are decades away from having the necessary infrastructure for such conventional vehicles. Further, the only load-carrying off-road vehicles presently in use have either very large wheels or very cumbersome tracks which are heavy, slow moving, and inappropriate for use on paved roads at normal highway speeds. While smaller all-terrain wheeled vehicles are commercially available, these do not carry adequate loads for normal multi-passenger or produce transport, and their drive wheels can easily become mired in heavy mud or snow. Therefore, track-laying vehicles of the type disclosed in the above-identified patent property promise great utility for the future.

Rubber endless tracks are well known and provide supporting contact between a track-laying vehicle and the terrain over which the vehicle is to be moved. The tracks are carried by a plurality of rotating elements (wheels, sprockets, etc.) mounted on the track-laying vehicle, the tracks being maintained in circumferential contact with these rotating elements and being driven thereby (or, in the case of trailer-like non-driven vehicles, being supported for rotation thereon). For purposes of this disclosure, endless tracks are described as having (a) a central plane in the direction of track rotation, (b) an overall track width measured perpendicular to the central plane and parallel to the axes of the vehicle's rotating elements about which the track moves, and (c) an overall track thickness measured vertically parallel to the central plane and perpendicular to the axes of the rotating elements.

Also, most tracks are formed around a basic carcass or belt element having respective interior and exterior surfaces with a predetermined width dimension co-extensive with the track's just-mentioned overall track width. Terrain-contacting lugs are formed integral with the exterior surface of this basic belt element, such lugs having a predetermined lug-thickness dimension.

Known rubber tracks include large lugs having a variety of well-known orientations, e.g., formed generally perpendicular to the track axis, or at an angle to the track axis, or in a chevron or modified-chevron design. Further, one special variety of such tracks, designed to be driven by rubber-tired wheels as disclosed and claimed in the above-identified patent property, has been shown appropriate for the needs of multi-use tracked vehicles that are capable of being driven at highway speeds on paved highways in addition to use over uneven off-road terrain. These latter special tracks include interior lugs for maintaining the track in alignment as it travels over the circumferences of the rubber-tired wheels, such lugs being located either in the center of the interior surface of the track (for designs appropriate for fitting between the tires of dual-wheels) or in two aligned rows near the outside edges of the track (for receiving a single tire therebetween).

Known rubber tracks, when mounted on the rotating wheels of vehicles, exert distinct resistive forces that must be overcome to move the vehicle, i.e., resistive forces in addition to those forces created by the load being carried and/or generated by the terrain. These further resistive forces relate to the additional tensions required to stretch the heavy lugs of the tracks around the wheels over which they are mounted and to the additional friction generated between the tracks and the terrain. While the latter frictional resistive forces are a valuable attribute under wet or snowy conditions, they add undesirably to energy costs when driving the vehicle over flat, hard surfaces.

The rubber endless track designs according to this invention are applicable to all rubber tracks and, particularly, are intended to increase the efficiency of the new off-road/highway-speed tracks specifically designed for multi-use tracked vehicles.

SUMMARY OF THE INVENTION

The invention modifies the lugs of conventional rubber tracks to increase energy efficiency of track operation by (a) reducing the force required to stretch the heavy lugs of the track as the track changes direction when being moved over the circumferential surfaces of the rotating elements of the vehicle's track suspension system and by (b) reducing the frictional drag of the lugs when the track is on flat, hard surfaces (e.g., pavement).

A relatively thin cut is made in each lug portion of the tracks. In the preferred embodiments of the invention, the cut is made perpendicular to the track's central plane and parallel to the axes of the vehicle's rotating drive/support elements, and the cut is made throughout substantially the entire thickness dimension of each lug down to the exterior surface of the carcass belt.

The track design of the invention also includes a further lug modification that is particularly applicable to those endless tracks used for suspension systems in which the track is supported and driven by rubber-tired wheels. This further modification selectively reduces the thickness of each lug by tapering each lug outboard of that central portion of the basic carcass/belt that is in direct contact with the rubber-tired supporting wheels. This modification reduces drag when driving over paved surfaces, while still providing desired additional traction when traversing wet or snow-covered terrain. This taper also facilitates pivot turning.

DRAWINGS

FIGS. 1A and 1B are, respectively, schematic side and top view representations of a prior art rubber endless track mounted over the drive and support wheels of a vehicle suspension for supporting the vehicle on terrain.

FIGS. 2A and 2B are, respectively, enlarged top and side views of a portion of the track illustrated in FIGS. 1A and 1B and modified according to the invention.

DETAILED DESCRIPTION

Figure 3A:
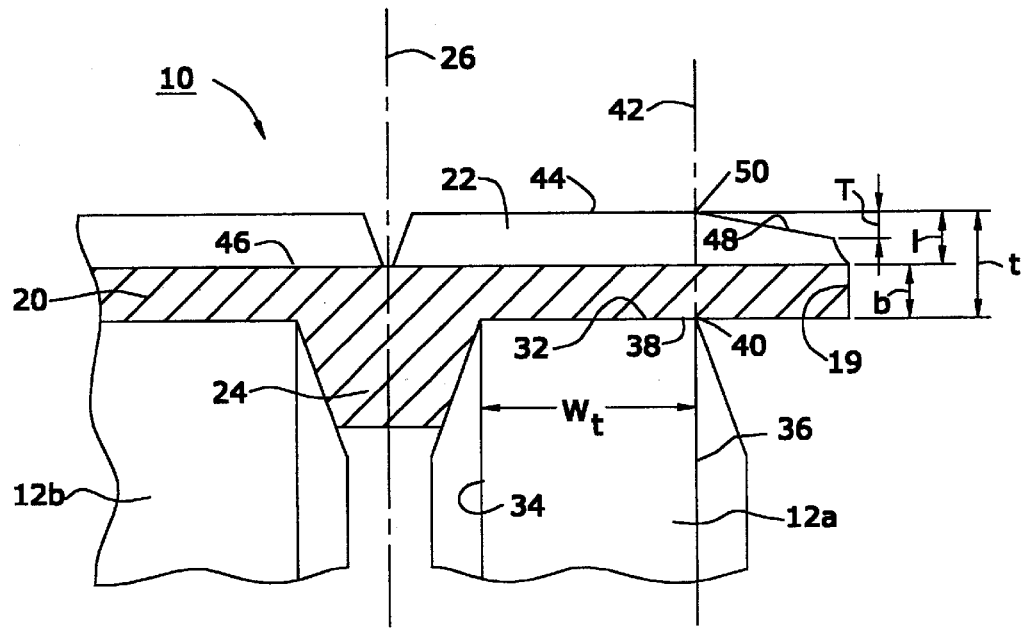
FIGS. 3A and 3B are, respectively, further enlarged schematic views of the track illustrated in FIG. 2B further modified according to the invention, FIG. 3A being a partial cross section taken generally along the line 3—3 in FIG. 2B, and FIG. 3B being a top view of the track.

While the invention is generally applicable to most rubber endless tracks, the prior art track illustrated schematically in FIGS. 1A and 1B represents a specialized design disclosed in U.S. patent application Ser. No. 09/213,650. This specialized track is not sprocket-driven but instead is stretched over wheels covered with rubber tires and is driven solely by frictional contact between the tires and the interior surface of the track. This invention has particular applicability to such frictionally driven tracks.

Rubber endless track 10 is mounted to a track-laying vehicle 11 by being suspended over two pairs of tandem, tire-covered wheels 12, 13 and 14, 15 as well as an idler wheel 16; and wheels 12 and 14 are drive wheels for causing the rotation of track 10. As can be seen in FIG. 1B, each of these just-mentioned tandem and idler wheels comprises a dual-wheel set, e.g., 16a and 16b, fixed to rotate together with a predetermined axial distance between the individual wheels of each set.

Like all known endless tracks, the basic carcass of track 10 comprises a belt 20 that has a width w measured between outside edges 18, 19. Formed integral with the exterior surface of belt 20 are a plurality of terrain-contacting lugs 22 which, in this instance, are arranged in a staggered-chevron pattern. Track 10 also includes a plurality of guide lugs 24 formed integral with the interior surface of belt 20 along its central plane 26. Each interiorly located guide lug 24 has a width selected to mate with the predetermined axial distance between the individual wheels of each dual-wheel set for centering belt 20 thereon.

When mounted on a track-laying vehicle, an endless track takes the general shape shown in FIG. 1A with the upper and lower portions of the track changing directions at each end as it travels over the circumferential surfaces of front and rear wheels 12 and 15. As the interior surface of belt 20 moves over these end wheels, the exterior surface of belt 20 is stretched relative to the interior surface and, more importantly, lugs 22 are stretched even more. This stretching is resisted by the rubber materials forming lugs 22, placing considerable tension on belt 20 and wheels 12 and 15; and overcoming this resistance requires a substantial force. Therefore, just flexing belt 20 as it rotates requires the expenditure of substantial energy in addition to that needed to move the vehicle and its load.

As indicated above, the invention modifies the lug portions of this prior art track. One modification increases the efficiency of track 10 by decreasing the resistance of lugs 22 to the stretching that occurs as belt 20 travels over wheels 12 and 15. As illustrated schematically in FIGS. 2A and 2B, a cut 30 is made in each lug 22. Each cut 30 is preferably made perpendicular to central plane 26 and perpendicular to the exterior surface of belt 20. As shown in FIG. 2B, as belt 20 passes circumferentially about wheel 12, it still conforms to the radius of curvature of wheel 12 and still places lugs 22 under tension. However, since cuts 30 open as belt 20 passes circumferentially about wheel 12, this tension is considerably reduced.

In this regard, FIG. 2B also indicates that belt 20 of track 10 has a predetermined belt-thickness dimension b, while each lug 22, which raises above the exterior surface of belt 20, has a predetermined lug-thickness dimension 1. These two combine to create an overall track thickness t measured parallel to central plane 26 (see FIG. 1 B) and perpendicular to axes 27, 28 of rotating wheels 12 and 15 (see FIGS. 1A and 1B). In the preferred embodiment of the invention, each cut 30 is made substantially through the entire lug-thickness dimension 1.

Figure 3B:
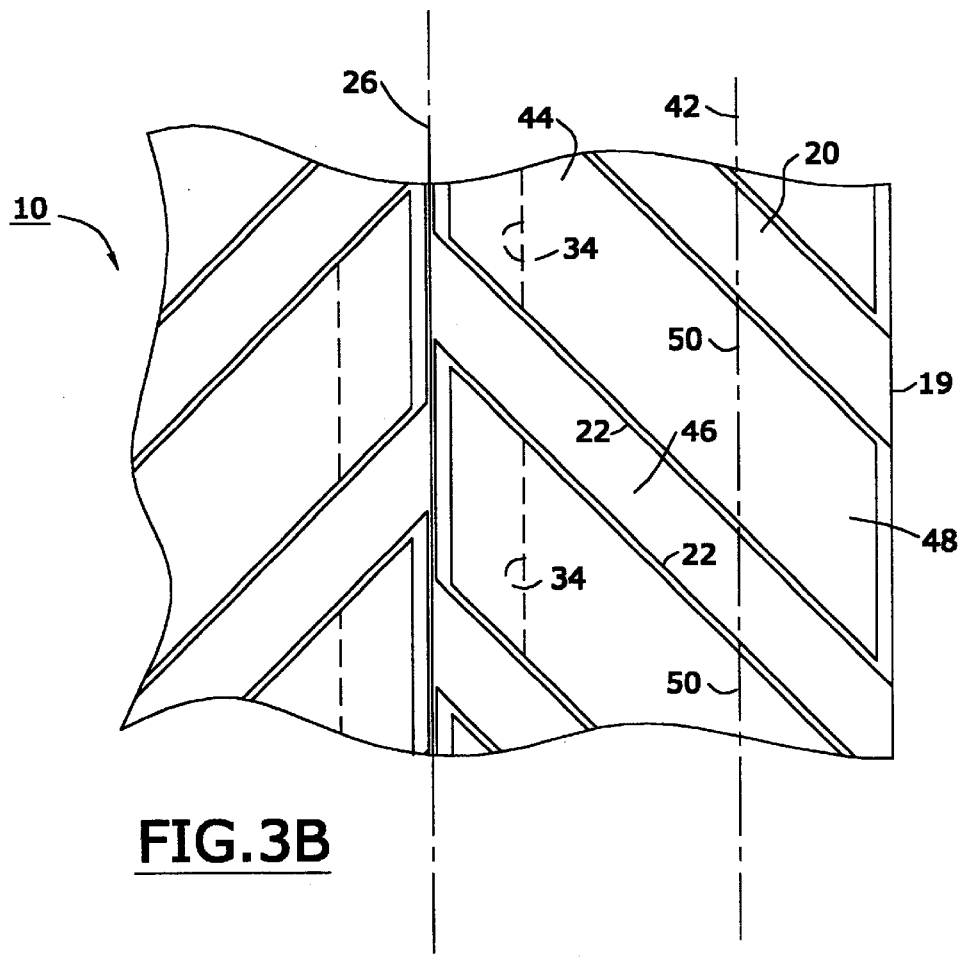

A further modification of each lug 22 according to the invention is illustrated in FIGS. 3A and 3B. A guide lug 24 of endless track 10 is shown captured between the dual-wheel tires 12a and 12b of tandem wheel 12 (see FIG. 1A). [NOTE: The following description of this further modification will indicate the changes to only the right hand portion of track 10 in FIGS. 3A and 3B. However, it should be understood that the partially illustrated left hand portions of track 10 are similarly modified in a mirror-image manner.]

Tire 12a has a circumferential, frictional contact surface 32 having edges 34, 36 separated by a predetermined tire width Wt designed for frictional contact with a mating portion 38 of the interior surface of belt 20. Mating portion 38 extends perpendicular to central plane 26, and it also extends from one side of interior guide lugs 24 to a line of intersection 40 with an outer plane 42 that is parallel to, and located a predetermined distance from, central plane 26. The distance between parallel planes 26 and 42 is selected so that each line of intersection 40 is aligned with outer edge 36 of circumferential contact surface 32 of rubber tire 12a.

As can be seen best in FIG. 3A, each terrain-contacting lug 22 has a top surface 44 that is parallel to the exterior surface 46 of belt 20, and an outer cantilever section of belt 20 mating portion 38 of belt 20 is cantilevered beyond outer edge 36 of rubber tire 12a. In the prior art design, top surface 44 remains parallel to exterior surface 46 of belt 20 throughout the entire width of track 10; and this cantilevered portion of track 10, while quite important to increasing the footprint of the track to increase traction on soft and snowy terrain, actually detracts from the efficacy of the track when the vehicle is traversing paved roads at relatively high highway speeds.

In contrast, as modified by the invention, top surface 44 of each lug 22 includes a tapered portion 48 that extends, coextensive with the cantilever section of belt 20 in a direction away from central plane 26, from a second line of intersection 50 with outer plane 42 toward outside edge 19 of track 10. Tapered portion 48 has a tapering thickness dimension T designed so that the thickness of track 10 is (a) equal to overall track thickness t beneath line of intersection 50 and (b) less than overall track thickness t, but greater than belt-thickness dimension b, at outside edge 19.

Tapering thickness dimension T is selected so that, when the terrain is flat pavement, tapered portions 48 are substantially out of contact with said terrain; and, as the terrain softens (e.g., loose dirt, mud, snow, etc.), the contact between tapered portions 48 and the terrain increases.

We claim:

1. An endless rubber track for use with a track-laying vehicle having a plurality of rotating elements for receiving said track so that said track provides supporting contact between said vehicle and the terrain over which said vehicle is to be moved, said rotating elements comprising individual wheels covered by rubber tires making circumferential contact with the front and rear of said track and having a predetermined radius about which said track is moved during rotation, said endless track having (a) a central plane in the direction of track rotation, (b) an overall track width measured between outside edges of said track perpendicular to said central plane and parallel to the axes of said rotating elements, and (c) an overall track thickness measured vertically parallel to said central plane and perpendicular to said axes of said rotating elements, said endless track comprising:

a belt element with respective interior and exterior surfaces extending perpendicular to said central plane and (a) having a predetermined width dimension co-extensive with said overall track width, and (b) also having a predetermined belt-thickness dimension less than said overall track thickness;

terrain-contacting lugs formed integral with said exterior surface of said belt element, each said lug being provided with a predetermined maximum lug-thickness dimension so that said maximum lug-thickness dimension, when added to said belt-thickness dimension, is equal to said overall track thickness;

each said rubber tire having a circumferential surface parallel with said axis of said rotating element, said circumferential surface having edges separated by a predetermined tire width designed for frictional contact with a mating portion of said interior surface of said belt element;

said mating portion of said interior surface of said belt element is centered about said central plane and extends perpendicular to said central plane in each direction to a first line of intersection with an outer plane that is parallel to, and located a predetermined distance from, said central plane so that each said first line of intersection is aligned with one edge of said circumferential surface of one of said rubber tires and so that a cantilever section of said belt element extends in cantilever fashion beyond said mating portion of said interior surface;

each said terrain-contacting lug has a top surface parallel to said exterior surface of said belt element, said parallel top surface extending from said central plane to said outer plane;

said top surface of each said lug further comprises a tapered portion coextensive with said cantilever section extending from a second line of intersection with said one of said outer planes, in a direction away from said central plane, toward an outside edge of said endless track, each said lug having a tapering thickness dimension so that the thickness of said track is (a) equal to said overall track thickness beneath said second line of intersection with said outer plane and (b) less than said overall track thickness, but greater than said belt thickness dimension, at the outside edge of said track; and said tapering thickness dimension being selected so that, when said terrain is flat and hard, said tapered portions are out of contact with said terrain, and as said terrain softens, the contact between said tapered portions and said terrain increases.

2. The endless rubber track of claim 1 wherein the lug-thickness dimension of each said terrain-contacting lug has at least one tension-reducing cut formed therein, said cut being positioned to decrease the resistance of said lug to being stretched when the direction of rotation of said track is changed as said track is moved over the circumferential surfaces of said tire covered rotating elements.

3. The endless rubber track of claim 2 wherein said cut is made throughout substantially the entire lug-thickness dimension of said lug.

4. The endless rubber track of claim 2 wherein said cut is made perpendicular to both said central plane and to said exterior surface of said belt element.

5. The endless rubber track of claim 1 wherein said endless track further comprises a plurality of alignment lugs formed on said interior surface of said belt element to maintain the alignment of said track relative to said circumferential surfaces of said tires.

6. The endless rubber track of claim 5 wherein said rotating elements mounted on said track-laying vehicle further comprise dual-wheel sets covered by rubber tires and fixed to rotate together with a predetermined axial distance between the individual wheels of each said dual-wheel set; and said alignment lugs formed on said interior surface of said belt element are spaced from each other in alignment with said central plane of the track and formed integral with said interior surface of said belt element, said lugs having a width selected to mate with said predetermined distance between said individual-wheels of each dual-wheel set for centering said track thereon.

* * * * *